United States Patent [19]
Nakamura et al.

[11] Patent Number: 5,339,134
[45] Date of Patent: Aug. 16, 1994

[54] AUTOMATIC DOCUMENT FEEDER FOR IMAGE FORMING APPARATUS

[75] Inventors: Hajime Nakamura, Tokyo; Tokumi Matsunami, Yokohama, both of Japan

[73] Assignee: Kabushiki Kaisha Toshiba, Kawasaki, Japan

[21] Appl. No.: 31,846

[22] Filed: Mar. 16, 1993

[30] Foreign Application Priority Data

Mar. 31, 1992 [JP] Japan .................................. 4-106221

[51] Int. Cl.[5] .......................................... G03G 21/00
[52] U.S. Cl. ...................................... 355/202; 271/3; 271/4; 355/309; 355/321; 358/444
[58] Field of Search ............... 355/200, 202, 230, 318, 355/309, 321; 271/3, 4, 65, 113; 346/108; 358/403, 404, 444, 524, 494, 496–498; 395/115, 116; 382/41, 48, 56, 61

[56] References Cited
U.S. PATENT DOCUMENTS

| | | | |
|---|---|---|---|
| 4,604,653 | 8/1986 | Shimizu | 358/403 |
| 4,794,419 | 12/1988 | Shibazaki et al. | 355/202 |
| 4,897,735 | 1/1990 | Oneda | 358/403 X |
| 4,949,949 | 8/1990 | Holmes et al. | 271/3 |
| 5,222,157 | 6/1993 | Yoneda et al. | 358/403 X |

Primary Examiner—A. T. Grimley
Assistant Examiner—William J. Royer
Attorney, Agent, or Firm—Foley & Lardner

[57] ABSTRACT

An image forming apparatus includes a reading section for reading image data, an image forming section for forming an image based on the image data, and a filing section, having a disk memory section, for recording the image data. When a memory disk is inserted in the filing section, a copying mode is changed to a filing mode. The reading section is capable of reading information members, on which image data is recorded, in the read order suitable for image forming or the read order suitable for image filing. An optimal read order can be selected, depending on whether the memory disk is inserted in the filing section or the image forming section.

9 Claims, 14 Drawing Sheets

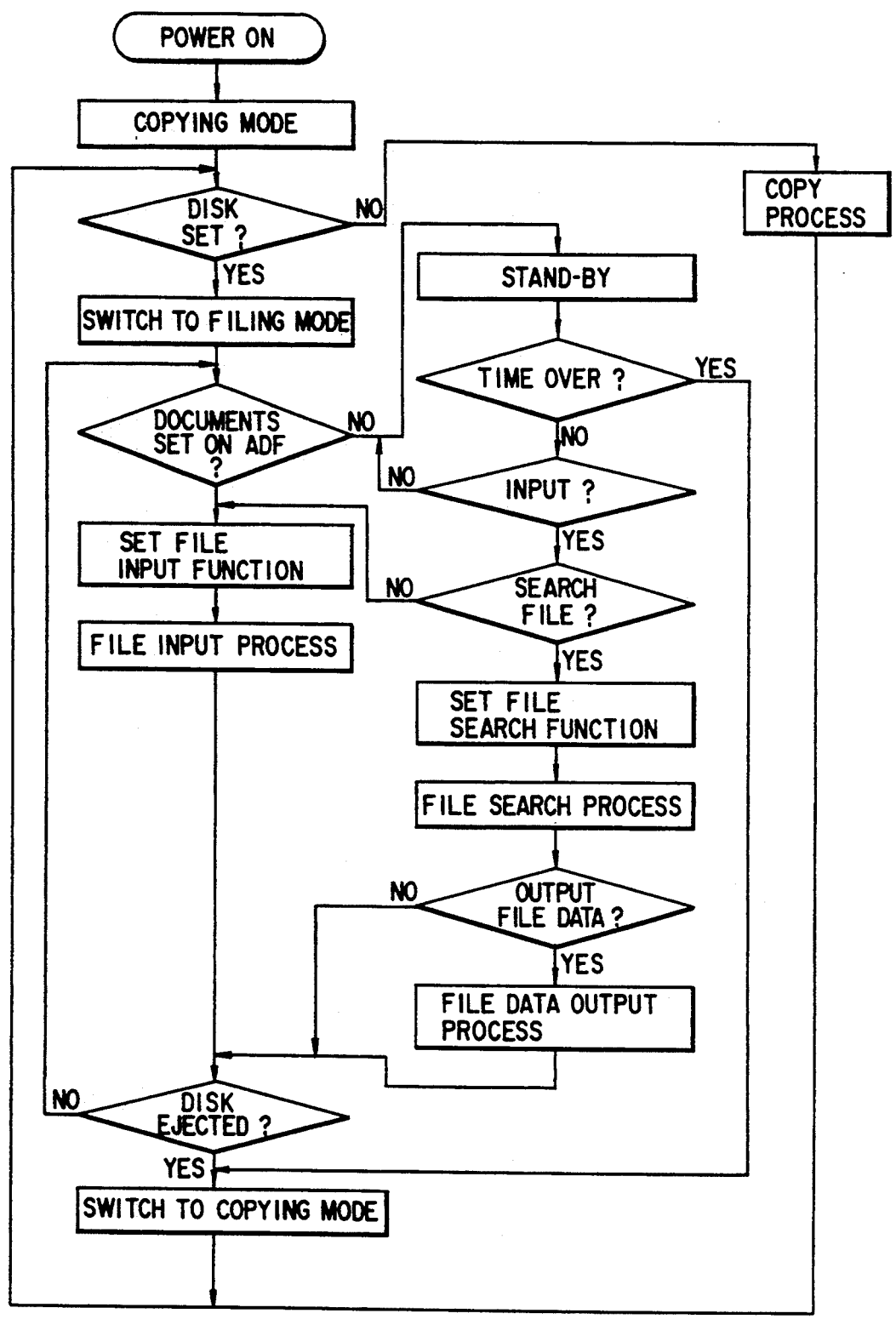
F I G. 9

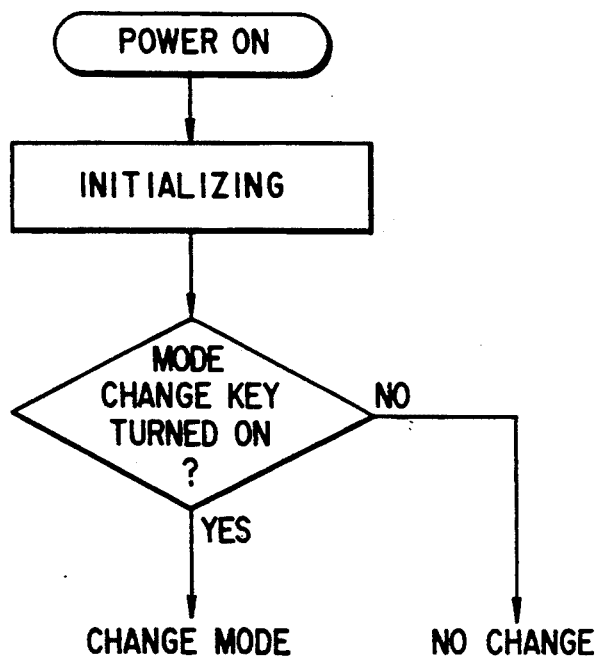
F I G. 12
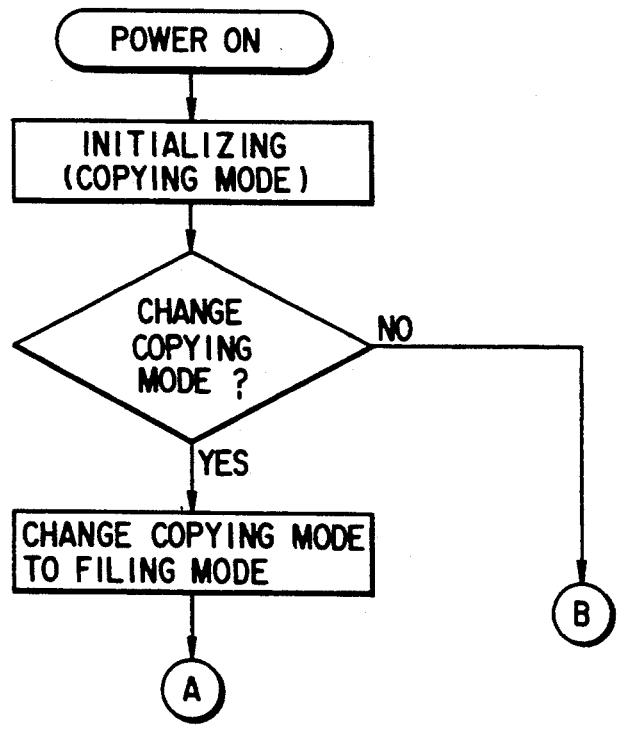
F I G. 13

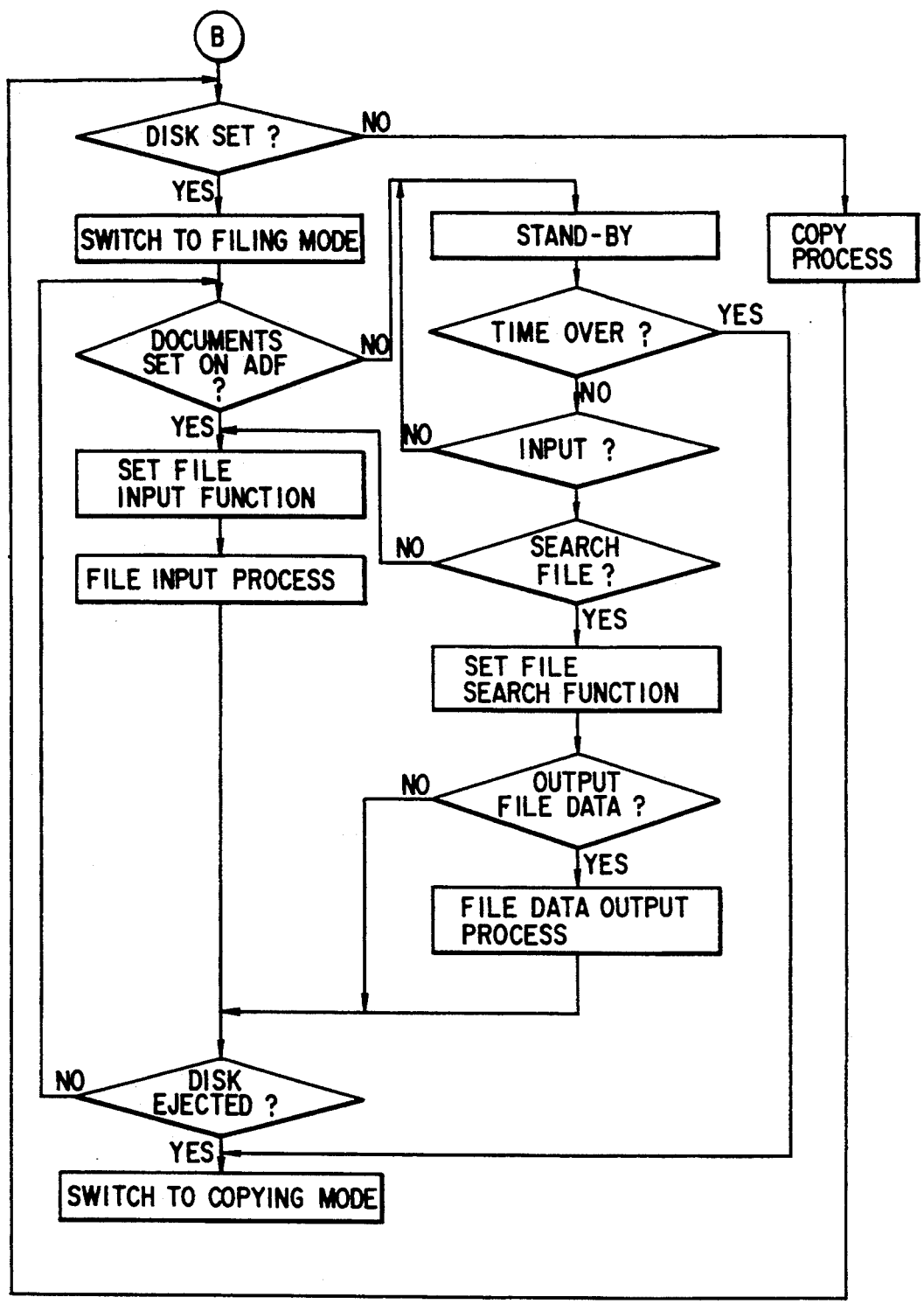
F I G. 16

AUTOMATIC DOCUMENT FEEDER FOR IMAGE FORMING APPARATUS

BACKGROUND OF THE INVENTION

1. Field of the Invention

The present invention relates to an image forming apparatus, and particularly to a printer system having a filing section for filing (or recording), for example, character and graphic information, and a printing section for printing information stored in the filing section.

2. Description of the Related Art

In recent years, the amount of office space used for storing information has grown, due to an increase in the amount of character and graphic information to be processed (hereinafter referred to as documents). To alleviate this situation, an information filing system utilizing a disk memory system (optical disk system) has been developed.

This filing system includes a display unit capable of displaying minute information and a large-capacity recording system, which enable sophisticated editing, and searching and recording functions based on a fixed filing style.

However, such a filing system is very expensive. In addition, it has too many functions for processing information, making it complicated to operate, with the result that a considerable period of time is required to record information.

In light of this, an image forming and filing (processing) apparatus (integrated printer apparatus) incorporating an optical disk system has been developed.

The integrated printer apparatus (hereinafter referred to as an integrated apparatus) has two modes: one is a copying mode wherein the apparatus functions as a copying apparatus, and the other is a filing mode wherein it functions as a filing apparatus.

The integrated apparatus has a reading unit for reading information recorded on a document to be copied or filed, an image forming unit for printing out the information, and a filing unit for filing of the information read by the reading unit. The image forming unit includes a laser printer section for outputting information read by the reading unit and information extracted from the filing unit. The filing unit, including a memory section (optical disk unit), stores the read information, searches the stored information, and displays it on a display section or outputs it to the image forming unit.

A document to be copied or filed is set on a document table of the reading unit such that a face on which character or graphic information is recorded (hereinafter referred to as an information face) faces the document table. The information recorded on the document is read by the reading unit and copied or filed in accordance with a request by the user.

When a copying operation is requested, the information recorded on the document set on the document table is read by the reading unit. The read information is converted to a printing signal to be output through the laser printer, and printed on a sheet of paper. If two or more copies of the document are requested, the above operation is repeated the number of times specified. If two or more documents are to be copied, one document is first copied in the above manner and replaced by another document, then the above operation is repeated.

When a filing operation is requested, the information recorded on the document set on the document table is read by the reading unit. The read information is converted to a recording signal, and recorded on an optical disk by way of appropriate recording steps. If two or more documents are to be filed, information on one document is first filed in the above manner and the document is replaced by another document, then the above operation is repeated.

In general, an ADF (Automatic Document Feeder) is used in combination with the reading unit. The ADF replaces one document with another, when the first document has been completely read. With the ADF, documents can be fed consecutively one by one to the reading unit, with their information face facing the document table. As a result, the amount of time required for replacing documents to be copied or filed is reduced, since the user does not have to perform the replacing operation manually.

When the integrated apparatus with ADF is used in the copying mode, documents are set on a document tray with their information faces facing the document table. The documents are consecutively fed into the ADF, beginning with the last page, which is positioned at the top of the stack of documents. A fed document is transported to a read reference position on the document table, and information recorded thereon is read as image information. The read image information is converted to electrical signals, which are, in turn, converted to printing signals by appropriate processing. Information corresponding to the printing signals is printed out on a sheet of paper through a laser beam printer section. The sheet of paper on which the information is printed is output to a stacker tray and stacked therein, with its printed face facing in the opposite direction to the document table. If two or more copies of each document are requested, the reading and printing operations are repeated the number of times requested with respect to each document until the last document (leading page).

After information on a document has been read, the document is reversed in the ADF so that the information face is facing in the opposite direction to the document table, and output to a document stacker tray, the documents being stacked in the order where the leading page and the last page are respectively positioned at the top and the bottom of the document stack. The printed paper sheets output to the stacker tray are also stacked in this order.

When the integrated apparatus with ADF is used in the filing mode, information recorded on documents is read in consecutive fashion, beginning with the last page, i.e., in the same manner as in the copying mode. The read information is converted to electrical signals and temporarily stored in, for example, a hard disk or a D-RAM. When the information on all of the documents has been read, the temporarily stored information is recorded in a memory medium, such as an optical disk. If two or more documents are to be filed, the above reading operation is repeated with respect to each document until the leading page. After information on a document has been read, the document is reversed in the ADF so that the information face is facing in the opposite direction to the document table, and is output to a document stacker tray.

When the documents (on which character and graphic information are recorded) include an index and abstract on a leading page, the information on the leading page is recorded in the initial storage portion of an optical disk. However, when the integrated apparatus with ADF is used in the filing mode, documents are read beginning with the last page, i.e., in the same order as in the copying mode. Hence, it is necessary to rearrange the information temporarily stored in a hard disk or D-DRAM so that the information begins with the leading page when it is stored in the optical disk. Therefore, when the information on all the documents has been temporarily stored, the information is arranged in the reverse order to that of the read information.

The above situation is disadvantageous, since it necessitates that a hard disk or D-RAM of increased memory capacity be used and increases the time required to store all the information in the optical disk. In addition, because the document stacker tray is used to stock documents to be copied and documents to be filed after reading operations, therefore if a copying operation is interrupted by a filing operation or vice versa, documents to be filed and documents to be copied may be mixed together on the document stacker tray.

Further, the integrated apparatus with ADF is initialized in the copying mode when its power switch is turned on, and is on standby as a copying apparatus. However, when the integrated apparatus is used as a filing apparatus, it must be switched from the copying mode to the filing mode. If, thereafter, the integrated apparatus is used as a copying apparatus, it must be switched from the filing mode to the copying mode.

SUMMARY OF THE INVENTION

It is accordingly an object of the present invention to provide an image forming system which can switch from one processing mode to another processing mode based on procedures specific to the respective processing modes.

Another object of the present invention is to provide an image forming system which can read documents in different orders, in accordance with the processing mode set.

Still another object of the present invention is to provide an image forming system wherein documents which have been read in the order opposite to the original order are stacked in the original order.

To achieve the above objects, according to an aspect of the present invention, there is provided an image reading apparatus comprising:

means for reading images recorded on documents;

means for holding the documents on which the images to be read by the reading means are recorded;

means for taking out the documents from the holding means, one by one, beginning with one of a top and a bottom sheet of the documents; and means for transporting the documents taken out by the taking out means to the reading means.

According to another aspect of the present invention, there is provided an image forming apparatus comprising:

means for reading images recorded on documents;
means, including an image bearing member, for forming an image on the image bearing member based on an image read by the reading means and forming the image on a transferring member;

means for holding the documents on which the images to be read by the reading means are recorded;

means, having a recording medium, for storing the images read by the reading means in the recording medium;

means, including a first taking out roller member for taking out a top sheet of the documents and a second taking out roller member for taking out a bottom sheet of the documents, for feeding the documents by means of the first taking out roller member when the images read by the reading means are to be formed on the image forming means, and by means of the second taking out roller member when the images are to be stored in the recording medium of the storing means; and means for transporting the documents taken out by the taking out means to the reading means.

According to further aspect of the present invention, there is provided an image forming apparatus comprising:

means for reading images recorded on documents;

means for holding the documents on which the images to be read by the reading means are recorded;

means, including a first taking out roller member for taking out a top sheet of the documents and a second taking out roller member for taking out a bottom sheet of the documents, for feeding the documents;

means for transporting the documents taken out by the document taking out means to the reading means;

means, including an image bearing member, for forming an image on the image bearing member based on an image read by the reading means and forming the image on a transferring member;

means, having a recording medium which is inserted from outside, for storing the images read by the reading means in the recording medium;

means for inputting image data to the image forming apparatus from an external device such as a facsimile, a host computer, and a word processor; and means for selecting one of:

a) causing the storing means to store the image data input through the inputting means in the recording medium, when the recording medium is inserted in the storing means and no document is set on the holding means;

b) causing the second taking out roller member to take out a bottom sheet of the documents stacked on the holding means, the reading means to read an image on the bottom sheet of the documents, and the forming means to form the image read by the reading means, when the recording medium is inserted in the storing means and no document is set on the holding means;

c) activating the forming means, when image data is input through the inputting means in a state where no recording medium is inserted in the storing means and no document is set on the holding means, to form the image on the basis of the image data input through the inputting means; and d) causing the first taking out roller member to take out a top sheet of the documents stacked on the holding means, the reading means to read an image on the top sheet of the document, and the forming means to form the image read by the reading means, when the documents are set on the holding means in a state where no recording medium is inserted in the storing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 9 is the flowchart for explaining a process of initializing immediately after the power switch of the image forming system is turned on and the process of changing modes;

FIG. 12 is a flowchart showing initializing and mode-setting processes which are different from those shown in FIGS. 9 and 10;

FIGS. 13 to 16 are flowcharts for explaining processes which follow the processes shown in FIG. 12, wherein:

FIG. 13 shows a process of changing an initial mode when the initial mode is a copying mode;

FIG. 14 shows a process of setting a filing mode when a request for changing the mode is input;

FIG. 15 shows a process of changing an initial mode when the initial mode is a filing mode; and FIG. 16 shows a process of setting a copying mode when a request of changing the mode is input.

DETAILED DESCRIPTION OF THE PREFERRED EMBODIMENTS

Figure 1:
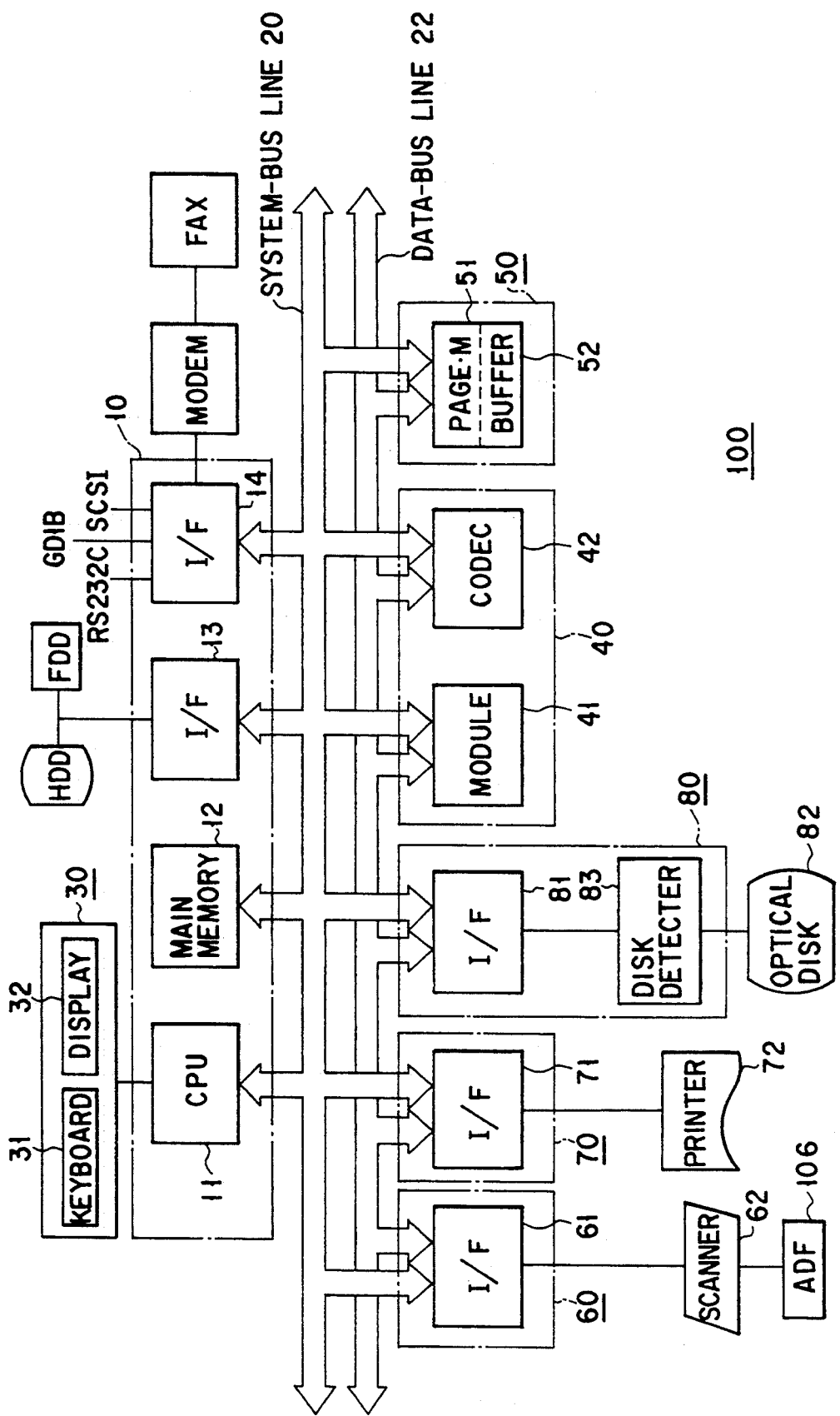
FIG. 1 is a schematic block diagram showing an image forming system according to an embodiment of the present invention.

FIG. 1 is a schematic diagram showing an image forming system according to an embodiment of the present invention.

An electrical filing and printing system 100 includes a main control unit 10, a system-bus line 20, a data-bus line 22, an image data processor unit 40, a memory unit 50, a reading section 60, a printing section 70, and a data filing section 80.

The main control unit 10 has a CPU 11, a main memory 12, a basic I/F (interface) 13, and an auxiliary (AUX) I/F 14, and the like. The CPU 11 controls the units and sections included in the system 100, simultaneously or individually. The main memory 12 stores programs for, e.g., controlling the entire system. The basic I/F 13 is connected to a hard disk drive (HDD) and a flexible disk drive (FDD) for reading a great amount of data supplied from a memory medium, for example, a hard disk memory (HD) or a flexible disk memory (FD). The AUX I/F 14 interfaces the system 100 with an external device. The main memory 12, the basic I/F 13 and the AUX I/F 14 are connected to the CPU 11 through the system bus line 20.

The CPU is connected through an interface connection (not shown) to the console panel 30 through which data and control signals are input by the user. The console panel 30 includes a keyboard 31 used for inputting various data and a display panel 32 for displaying various conditions.

The main memory 12 includes a non-volatile memory for storing initializing data prestored in the system 100 when the system 100 is forwarded from the manufacturer. When the initializing data has been used, previously set initializing data (updated data) is stored in the non-volatile memory.

The AUX I/F 14 receives/sends data from/to an external device (not shown), for example, a host computer or word processor. For this purpose, specific interfaces, e.g., GDIB, RS232C, and SCSI, are set in the AUX I/F 14 and connected to the host computer or word processor. The AUX I/F 14 is also connected to a modem MD which is connected to a communication device (not shown), for example, a facsimile and telephone set for remote-controlling the system 100.

The system-bus line 20 transmits a large number of signals for controlling the system 100. More specifically, it is used to control the main control unit 10, the image data processor unit 40, the memory unit 50, the reading section 60, the printing section 70, and the data filing section 80.

The data-bus line 22 is used only to transmit data among the image data processor unit 40, the memory unit 50, the reading section 60, the printing section 70, and the filing section 80 with higher transmitting-speed, respectively.

The image data processor unit 40 includes an image processing module 41 for processing data read through the reading section 60 under predetermined conditions. It also includes a CODEC 42 for compressing and expanding data.

The memory unit 50 has a page memory 51 of a capacity corresponding to data containing several pages of A3 size paper and a buffer memory 52 for temporarily storing data.

The reading section 60 includes a scanner unit 62 for optically reading information recorded on a document to be read and converting it to serial electrical signals. The section 60 also includes a scanner interface 61 for connecting the scanner unit 62 to the CPU 11. The scanner unit 62 is connected through the system-bus line 20 and the scanner interface 61 to the CPU 11.

The printing section 70 contains a laser beam printer unit 72 for forming an image from data stored in the page memory 51 and outputting the image to a sheet of paper P as a hard copy. The section 70 has a printer interface 71 for connecting the printer unit 72 to the CPU 11. The laser beam printer unit 72 is connected to the CPU 11 through the system-bus line 20 and the printer interface 71.

The filing section 80 includes an optical disk apparatus 82 for storing various data, which is read through the scanner unit 62 or supplied from an external device (not shown), in a large-capacity recording medium, such as an optical disk. Section 80 further includes a disk detector 83 for detecting whether the disk apparatus 82 is set or not, and a filing interface 81 for connecting the disk apparatus 82 and the disk detector 83 to the CPU 11.

Figure 2:
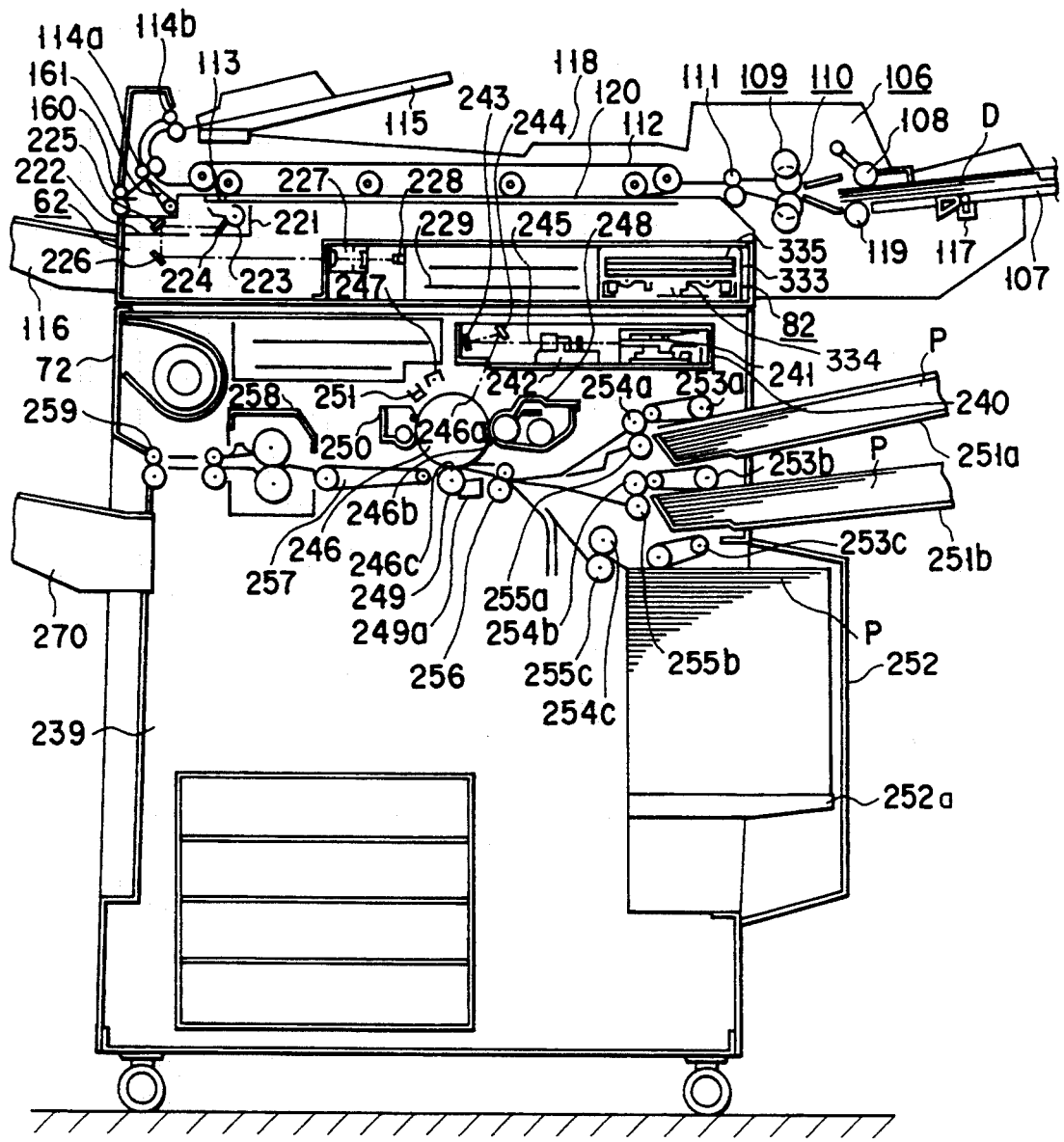
FIG. 2 is a schematic sectional view showing a mechanical portion of the image forming system shown in FIG. 1.

FIG. 2 schematically shows a mechanical portion of the electrical filing and printing system 100 shown in FIG. 1.

The scanner unit 62 has a document table 120, a first carriage 221, a second carriage 222, a reading unit 229 including a focus lens 227 and a CCD sensor 228, and an ADF (Automatic Document Feeder) 106 for consecutively supplying documents, which should be copied or filed, to the document table 120.

The laser beam printer unit 72 contains a laser optical unit 240 and an image forming section 239 for printing an image to a sheet of paper P serving as a recording medium by a electrophotography process.

The optical disk apparatus 82 of the data filing section 80 includes an optical disk member 333 as a memory medium, a disk driving motor 234 for driving the disk member 333, an optical head device (not shown) for recording/reading data in/from the disk member 333, and a disk unit controller 335.

The ADF 106 has a document tray 107 on which a plurality of documents D are set so that information faces the table and a document detector 117 for detecting whether documents D are set on the document tray 107. The ADF 106 contains a picking-up roller 108 for picking the documents D set on the document tray 107 beginning with the last page (the top sheet), and a feeding roller 119 for picking the documents beginning with the leading page (the bottom sheet). The ADF 106 further contains a transporter unit 118 for transporting the documents D supplied through the rollers 108 and 119 to the document table 120.

The ADF 106 includes upper and lower transporting roller units 109 and 110, an aligning roller 111, a transporting belt 112, and a document stopper 113. The upper transporting roller unit 109 transports documents D picked up by the picking up roller 108 one by one, and the lower transporting roller unit 110 transports documents D picked up by the feeding roller 119 one by one. A document D supplied by the roller unit 109 or 110 is guided by the aligning roller 111 to the transporter unit 118. The transporter unit 118 includes the transporting belt 112 for transporting a document D. The document D transported by the belt 112 is stopped at a reference position of the table 120 by the document stopper 113 which is located near the reference position.

The upper transporting roller unit 109 is constituted by a feeding roller 109a (upper) and a separator roller 109b (lower). The lower transporting roller unit 110 is constituted by a feeding roller 110a (lower) and a separator roller 110b (upper) see FIG. 3.

The feeding roller 109a (upper) and the separator roller 109b (lower) extend along an axis perpendicular to the direction in which a piece of the document D is transmitted, such that they can be pressed against each other. The rollers are arranged parallel to each other and forced by springs (not shown) in directions so as to form an appropriate gap therebetween. The rollers can be pressed against each other by solenoids which force the rollers in the opposite directions forced by the springs. The feeding roller 110a (lower) and the separator roller 110b (upper) are arranged in the same manner as the rollers 109a and 109b.

The feeding roller 109a, the picking up roller 108, the feeding roller 110a, and the feeding roller 119 are rotated in the same direction. The separator roller 109b and the separator roller 110b, which can respectively be pressed against the feeding roller 109a and the feeding roller 110a, are rotated in the opposite direction.

The ADF 106 further includes first and second document stacker trays 115 and 116, first and second outputting rollers 114a and 114b, a sub-outputting roller 160, and a separating gate 161. Documents D picked up by the picking-up roller 108 beginning with the last page are consecutively scanned and stacked on the first document stacker tray 115. Documents D picked up by the feeding roller 108 beginning with the leading page are consecutively scanned and stacked on the second document stacker tray 116. The first and second outputting rollers 114a and 114b are interposed between the transporting belt 112 and the tray 115, and consecutively transports the scanned documents to the tray 115. The sub-outputting roller 160 is interposed between the transporting belt 112 and the tray 116, and transports the scanned documents to the tray 116. The separating gate 161 for separating the documents to the respective trays.

An operation of the system 100 will be described below.

In reading information of documents D, there documents are placed on the document table 120 with its information face facing the document table.

Figure 3:
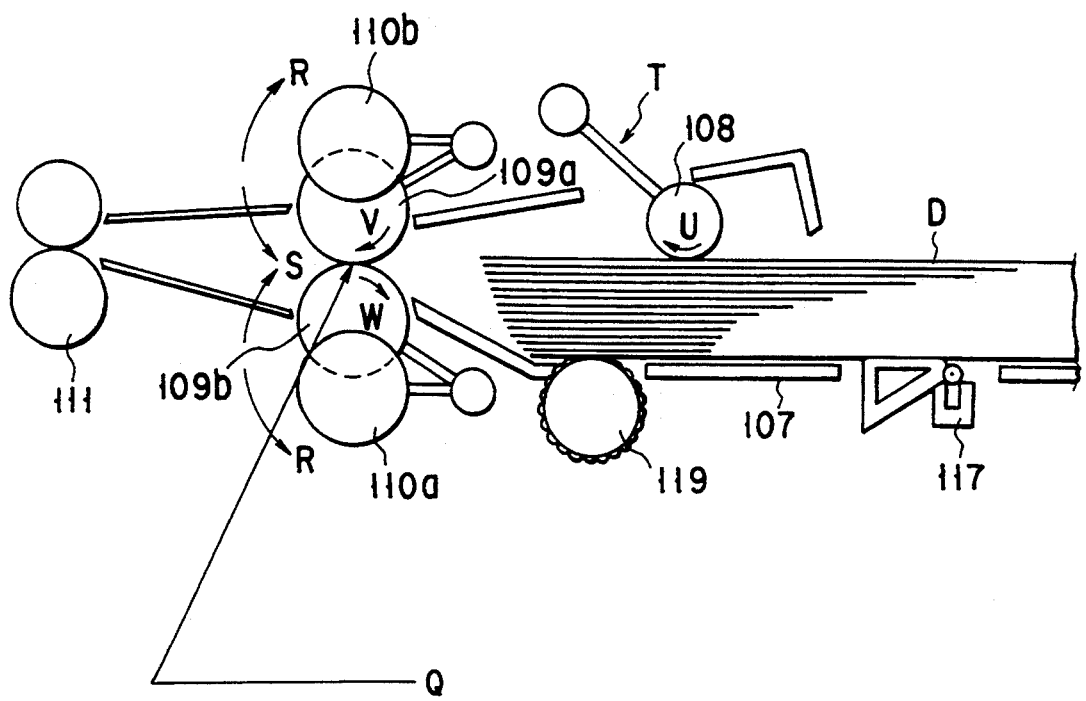
FIG. 3 is a side view for explaining a first feeding operation of the image forming system shown in FIGS. 1 and 2.
Figure 4:
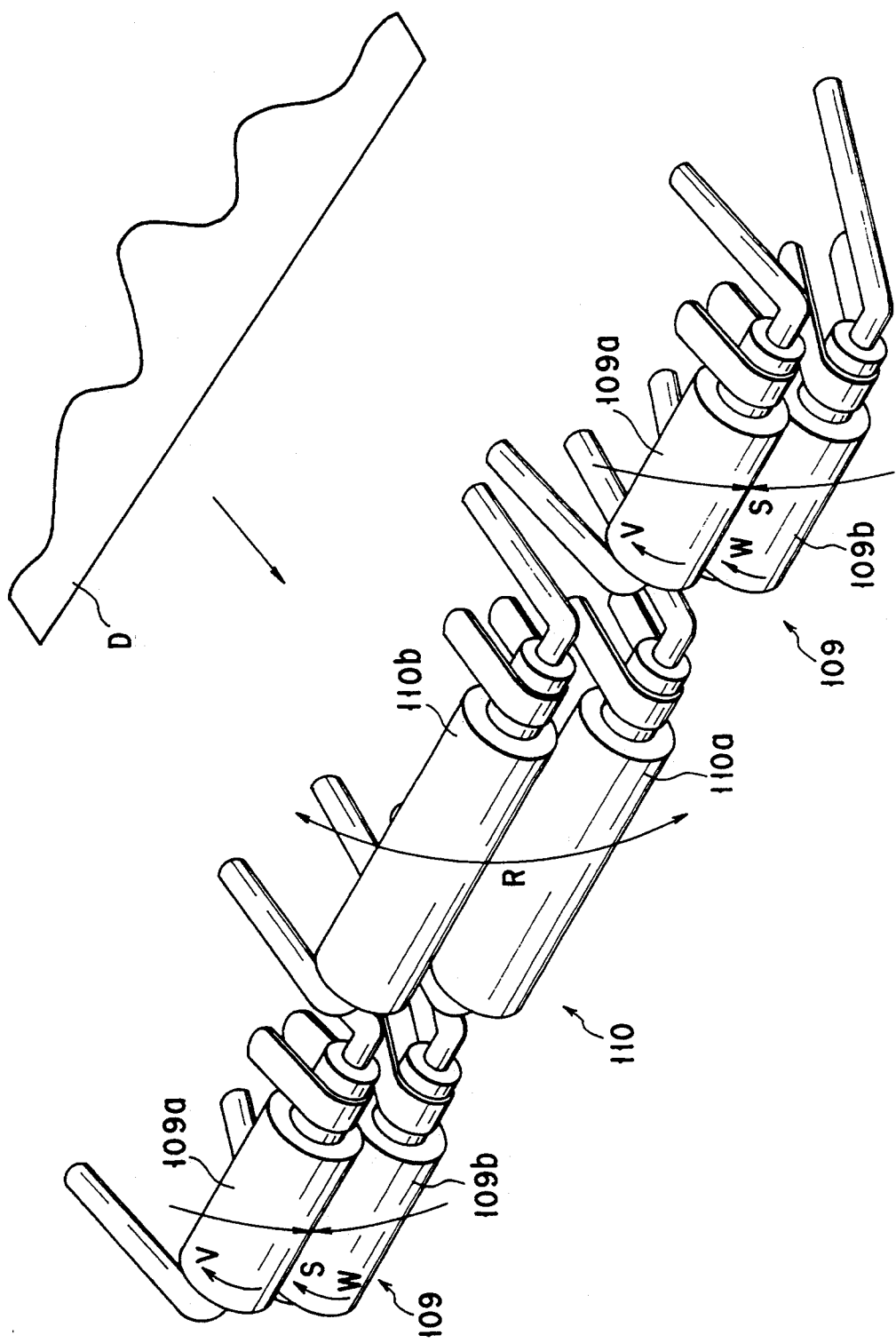
FIG. 4 is a schematic view for explaining more specifically the first feeding operation shown in FIG. 3.

In a copying mode, if documents D are supplied through the ADF 106, the document detector 117 detects that documents D are placed on the document tray 107. As a result, as shown in FIGS. 3 and 4, the feeding roller 109a and the separator roller 109b of the upper transporting roller unit 109 are moved toward separation points Q (each) in directions indicated by arrows S by means of the solenoids and the link. The rollers 109b and 109a, each of the upper unit 109, are pressed against each other.

When the picking up roller 108 is moved by a solenoid (not shown) in a direction T, it is brought into contact with document D. Then, the picking up roller 108 is rotated in a direction indicated by an arrow U, with the result that the last (top) sheet of the documents D is picked up. Documents D picked up from the tray 107 by the roller 108 are guided to the upper transporting roller unit 109. The documents D are separated one by one by the feeding roller 109a rotating in a direction of an arrow v and the feeding roller 109b rotating in a direction of an arrow W, and transported to the aligning roller 111. Thus, the documents D are consecutively transported to the document table 120 of the scanner unit 62 in the order from the last page to the first page, i.e., the top sheet to the bottom sheet.

The piece of document D transported to the aligning roller 111 is temporarily stopped, and aligned if slanted during the transports there. Thereafter, the document D is transmitted to the transporter unit 118. In the transporter unit 118, the document D is transported by the transporting belt 112 until it abuts against the document stopper 113.

Information is read from the documents D as follows. First, each of the documents D is supplied through the ADF 106 to the document table 120 such that the leftmost side of each document D is located in a substantially central portion of the leftmost side of the table.

The piece of document D is pressed against the document table 120 by the transporting belt 112 of the transporting unit 118 and radiated by a lamp 223.

Light reflected by the document D travels through mirrors 244, 225, and 226 and a focus lens 227 and is focused on a line CCD sensor 228 in which a plurality of light receiving elements are arranged substantially in one line.

The first carriage 221 includes the mirror 224, a luminous energy sensor (not shown) for detecting luminous energy emitted from the lamp 223, and a heater (not shown) for warming and for keeping the temperature of the lamp constant. The mirrors 225 and 226 are disposed on the second carriage 222. The first and second carriages 221 and 222 are moved in parallel to the document table 120 at the relative of 2:1.

The first and second carriages 221 and 222 are moved in synchronism with a read timing signal supplied from the scanner interface 61. They are moved along the document table 120, left to right in FIG. 2, by a pulse motor (not shown) or the like. The moving-speed of the first and second carriages 221 and 222 are determined on the basis of the reading magnification, for example, by driving a two-phase motor at $\frac{1}{2}$-phase energization or in a microstepping manner.

A pulse motor is driven by a pulse motor driver (not shown). When the pulse motor is driven at a low speed, a motor driving current having a special waveform is supplied from the motor driver to the motor, so that undesirable oscillation specific to the motor can be offset by natural oscillation.

In the manner as described above, information recorded on the piece of document D disposed on the document table 120 is read in line units of in a direction perpendicular to the direction in which the carriages 221 and 222 are moved. The read information is converted to 8-bit digital data representing the brightness and darkness of the information. The digital data is output to the buffer memory 52 of the memory unit 50 through the scanner interface 61 and the data-bus line 22.

Information read by the scanner unit 62 is transmitted to an image processing module 41 through the scanner interface 61 and the data-bus line 22. In the module 41, the information is converted to printing signals, which are transmitted to the laser beam printer unit 72 through the data-bus line 22 and the printer interface 71.

After the information is read, the document D is further transported by the transporting belt 112 to the first outputting roller 114a, and then discharged to the first document stacker tray 115 through the second outputting roller 114b, so that the information face is visible (facing upward).

The above-described operation is repeated until all the documents D set on the document tray 107 are fed to the first document stacker tray 115. As a result, the documents D after reading are stacked on the stacker tray 115, with their information faces facing upward. The documents D are stacked on the stacker tray 115 in the same order as in the document tray 107, i.e., from the leading page to the last page, although the information faces of the documents D face in the opposite direction.

Figure 5:
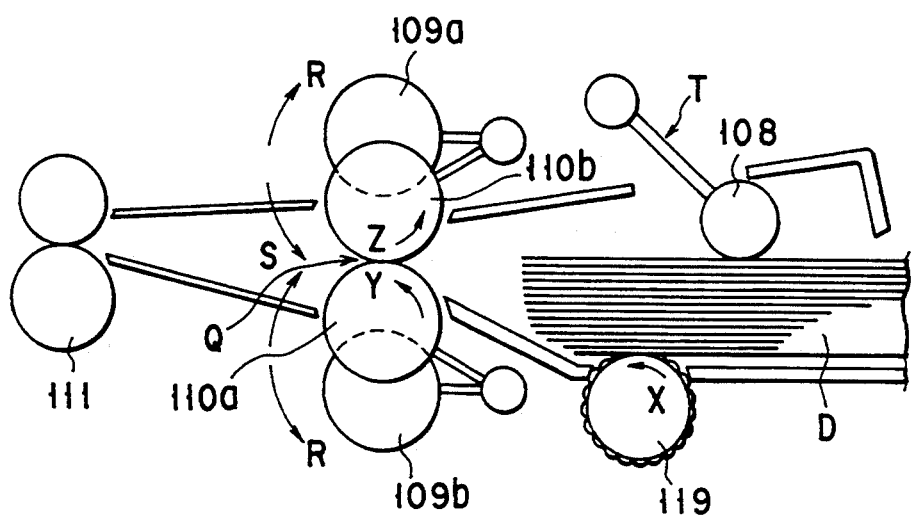
FIG. 5 is a side view for explaining a second feeding operation of the image forming system shown in FIGS. 1 and 2.
Figure 6:
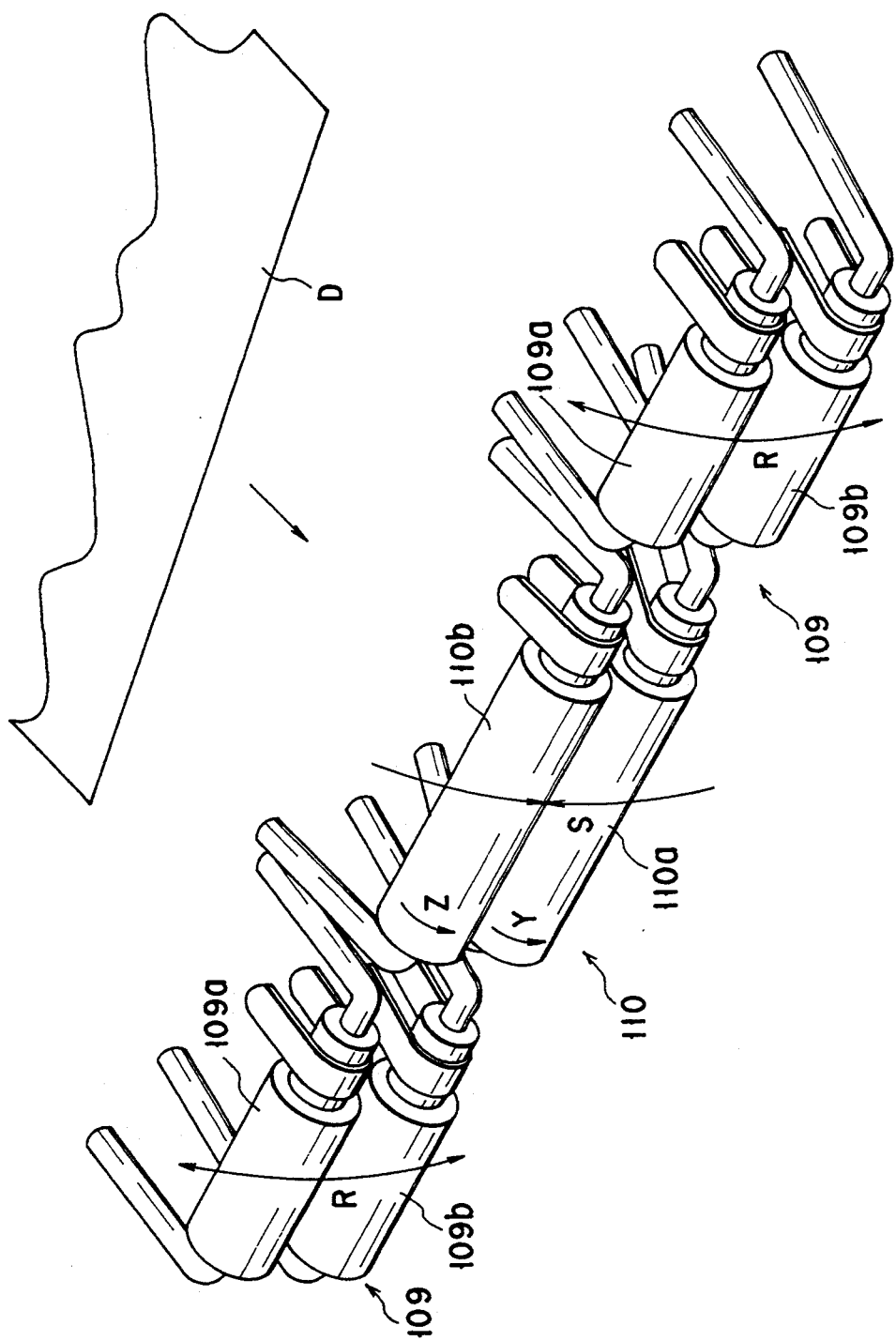
FIG. 6 is a schematic view for explaining more specifically the second feeding operation shown in FIG. 5.

In a filing mode, if documents D are supplied through the ADF 106, the document detector 117 detects that documents D are placed on the document tray 107. As a result, as shown in FIGS. 5 and 6, the feeding roller 110a and the separator roller 110b of the lower transporting roller unit 110 are moved toward the separating point Q in directions indicated by arrows S by means of the solenoids and the link. The rollers 110a and 110b each of the lower unit 110 are pressed against each other.

When the picking up roller 108 is moved by the solenoids in a direction indicated by an arrow T, the lowermost sheet of the documents D is pressed against a feeding roller 119. Then, the feeding roller 119 is rotated in a direction indicated by an arrow X, with the result that the lowermost sheet is fed. Documents D picked up from the tray 107 by the roller 119 are guided to the lower transporting roller unit 110. The documents D are separated one by one by the feeding roller 110a rotating in a direction of an arrow Y and the feeding roller 110b rotating in a direction of an arrow Z, and transported to the aligning roller 111. Then, the documents D are consecutively transported through the transporter unit 118 to the predetermined position of the document table 120 of the scanner unit 62 in the order from the leading page to the last page, i.e., the top sheet to the bottom sheet.

Thereafter, information is read by the scanner unit 62 from each of the documents D in the same manner as in the copying mode.

Figure 7:
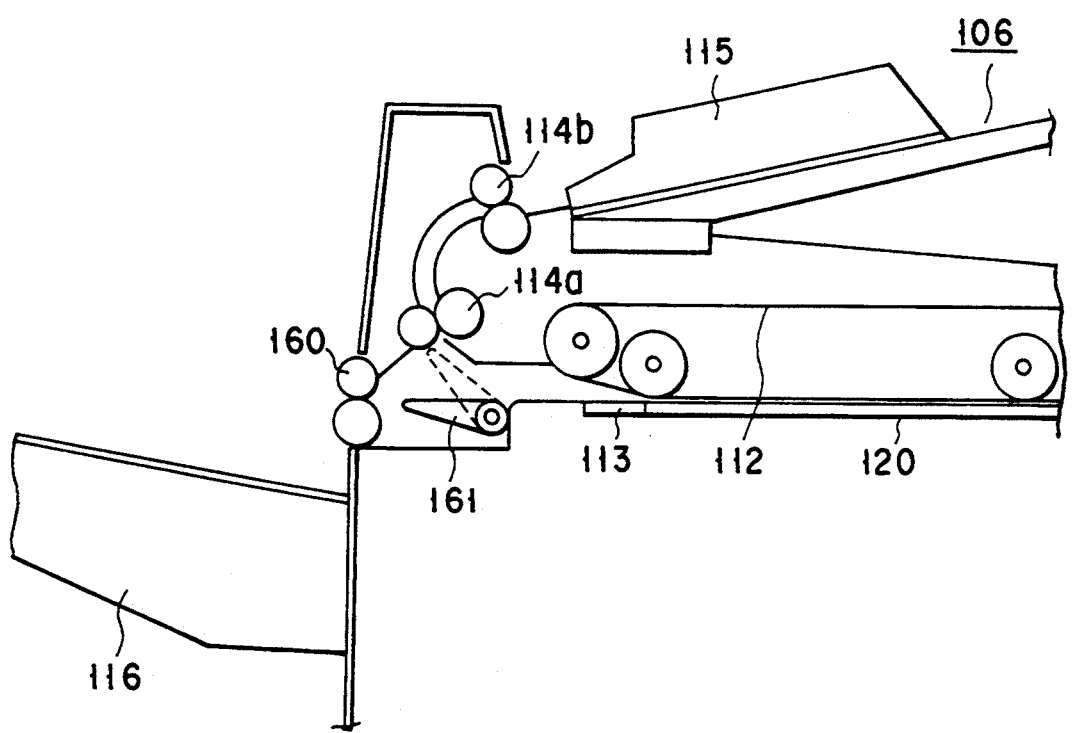
FIG. 7 is a schematic view for explaining a document-discharging operation of the system shown in FIGS. 1 to 6.

After the information is read, the document D is further transported by the transporting belt 112 to the separating gate 161. The separating gate 161 is rotated to the position indicated by the solid lines as shown in FIG. 7, with the result that the document D is transported to the sub-outputting roller 160, and then discharged to the second document stacker tray 116, so that the information face is not visible (facing downward).

The above-described operation is repeated until all the documents set on the document tray 107 are fed to the second document stacker tray 116. As a result, the documents D which has been scanned are stacked on the stacker tray 115, in the order where the leading page is positioned at the top and the last page is positioned at the bottom, with all the information faces facing downward. Thus, the documents D are stacked on the stacker tray 116 in the same order as in the document tray 107, i.e., from the leading page to the last page, and the direction of the information faces are also the same as in the document tray 107.

The information read by the scanner unit 62 is transmitted in units of lines through the scanner interface 61 and the data-bus line 22 to the CODEC 42. The CODEC 42 compresses the information in accordance with an appropriate rule and supplies the compressed data to the optical disk apparatus 82 through the data-bus line 22 and the filing interface 81.

More specifically, the compressed data is recorded in the optical disk member 333 as bits by means of an optical head device (not shown) which is accessed to a desired position by the disk unit controller 335. The optical disk member 333 is driven at a desired speed by the disk drive motor 234.

On the other hand, when data recorded in the optical disk member 333 is to be searched or output, the data recorded in a specific portion of the optical disk member 333 is read by the optical head device.

The read data is transmitted through the data-bus line 22 to the image data processor unit 40 and expanded by the CODEC 42 of the unit 40. The expanded data is processed by the image processing module 41 and output to the printer unit 72 through the data-bus line 22 and the printer interface 71.

The printer unit 72 contains, as described above, the laser optical unit 240 and the image forming section 239.

The image forming section 239 includes a photoconductor drum 246 on which an electrostatic latent image is formed by a laser beam 245, as will be described later in detail. A charging unit 247, a developing device 248, a transferring roller 249, a cleaning unit 250, and a discharging lamp 251 are arranged in proximity of the drum 246. The charging unit 247 includes a grid screen (not shown) and provides the drum 246 with a desired potential. The developing device 248 supplies toner, and develops the latent image on the drum 246. The transferring roller 249 transfers the toner image formed on the drum 246 to a sheet of paper supplied from the paper feeding section, as will be described later. The cleaning unit 250 removes toner remaining on the drum 246 (which are not transferred to the sheet of paper). The discharging lamp 251 removes the latent image remaining on the drum 246. The transferring roller 249 includes a roller cleaner 249a for removing toner which may adhere to itself.

The laser optical unit 240 includes a semiconductor laser element (not shown) for emitting a laser beam 245, a cylindrical lens (not shown), a beam shaping lenses (not shown) for shaping the beam spot of the laser beam 245, and a high-speed rotation motor (not shown) utilizing an air-gapped bearing. It also includes an optical deflector device 241 for deflecting the laser beam 245 and an fe lens 242 for converging the laser beam 245 with a desired converging force so that a necessary resolution can be obtained when the laser beam 245 arrives at an exposure position 246a of the drum 246. It further includes mirrors 243 and 244 for guiding the laser beam 245 to the drum 246.

Data transmitted through the data-bus line 22 and the printer interface 71 is synchronized by means of a printing control circuit (not shown) with a read timing at which each line is read. The data is output to the photoconductor drum 246 as a laser beam 245, which is turned on or off based on the data (or information).

The laser beam 245 is deflected by the optical deflector device 241 in a desired direction, and guided through the fθ lens 242 and the mirrors 243 and 244 to the developing position 246b of the drum 246 to which a desirable potential is applied through the charging unit 247. The drum 246 is rotated by a driving motor (not shown) at a rate at which the outer surface thereof is moved at a predetermined speed.

The laser beam 245 focused on the drum 246, which has been charged to a predetermined potential, forms an electrostatic latent image on the drum 246 by selectively dropping the potential of the drum 246. The latent image is transported to the developing position 246a at which the latent image on the drum 246 faces the developing device 248 as the drum rotates. At the developing position 246b, the latent image is developed by the toner and converted to a toner image.

The toner image is transported to a transferring point 246c at which the toner image faces the transferring roller 249. The toner image is transferred via the transferring roller 249 to a sheet of paper P supplied from the paper feeding section (to be described later).

The toner which is adhered to the transferring roller 249 and not transferred to the sheet of paper P is removed by the roller cleaner 249a.

The paper feeding section includes first and second paper cassettes 251a and 251b detachably inserted in slots (not shown), and a large capacity feeder 252 preset to a mounting portion (not shown). Sheets of paper P are selectively supplied from the paper cassettes 251a and 251b and the feeder 252 to the image forming section 239. An elevator 252a of the feeder 252 is movable up and down in accordance with the number of the sheets of paper P mounted thereon, so that the top of the sheets is kept at substantially the same height.

Picking-up rollers 253a, 253b, and 253c are provided on the cassettes 251a and 251b, and the feeder 252, respectively, in order to pick up sheets of paper P from the cassettes and the feeder. In addition, pairs of a feeding roller 254a and a separator roller 255a, a feeding roller 254b and a separator roller 255b, and a feeding roller 254c and separator roller 255c are respectively provided on cassettes 251a and 251b, and the feeder 252, in order to feed the sheets of paper P picked up by the rollers 253a, 253b, and 253c, one by one, to the image forming section 239. The feeding rollers 254a, 254b, and 254c respectively face the separator rollers 255a, 255b, and 255c.

A timing roller 256 is located between the roller pairs 254a and 255a, 254b and 255b, and 254c and 255c on one hand, and the transferring roller 249 of the image forming section 239 on the other. The timing roller 256 aligns the sheets of paper P if slanted during the picking-up or transport operation, and transports the sheets of paper P to the transferring roller 249 at a desired timing.

A sheet of paper P fed from one of the cassettes 251a and 251b and the feeder 252 is transported to the transferring point 246c via the timing roller 256. At the transferring point 246c a toner image is transferred from the drum 246 to the piece of paper P.

The sheet of paper P to which the toner image has been transferred is transported through a conveyor 257 to a fixing unit 258, wherein the toner image is fixed on the sheet of paper P. The sheet of paper P is discharged out of the system 100 by the outputting roller 259 and stacked on the stacker tray 270.

Figure 8:
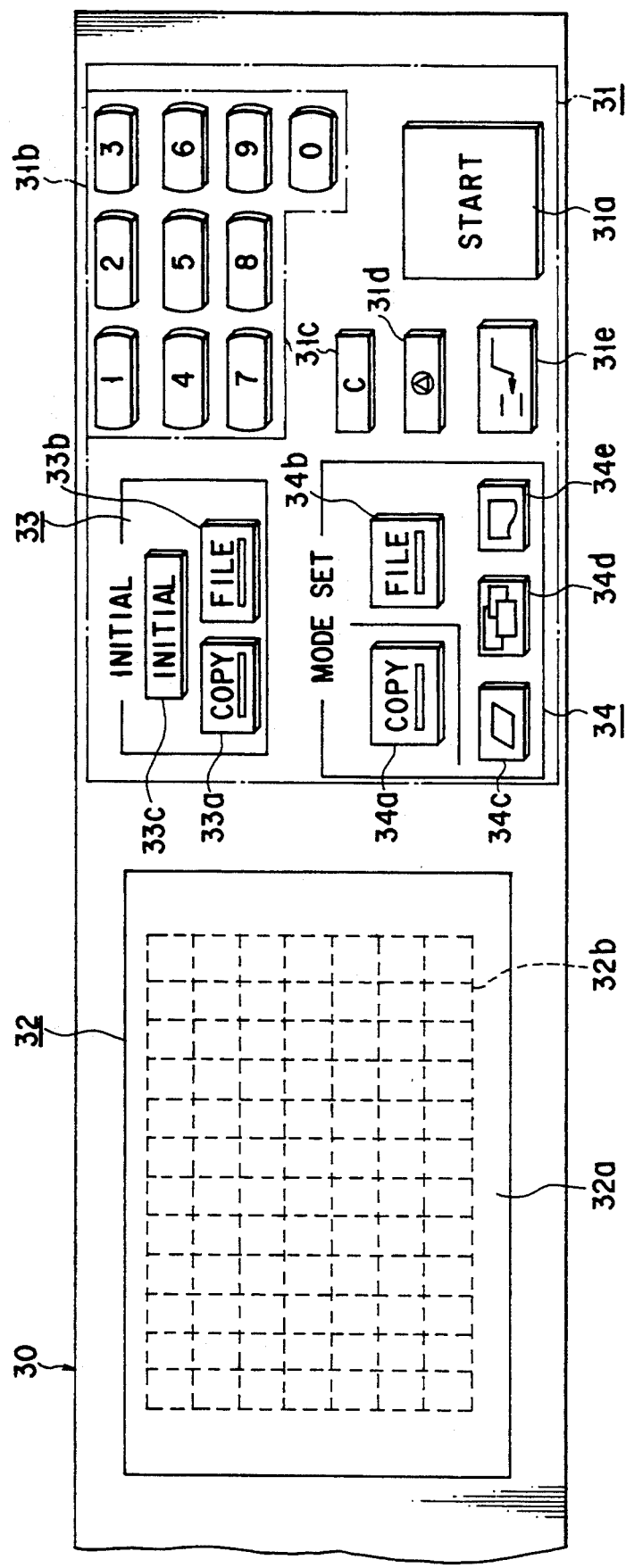
FIG. 8 is a schematic plan view showing a console panel of the system shown in FIGS. 1 to 7.

FIG. 8 is a schematic view of the console panel of the image forming system.

The console panel 30 is constituted by the keyboard 31 used to input data for an operation and the display panel 32 for displaying a state of the system, instructions of operations, and the like.

The keyboard 31 includes a print start key 31a to start copying or filing, a ten-key pad 31b used to input data, a clear key 31c for clearing input data, an all-clear key 31d for canceling all the input data and the set mode and returning the system to the initial state, and an interrupt key 31e for temporarily stopping the current operation and maintaining the system 100 at a state in which a new input can be accepted.

An initializing section 33 of the console panel 30 includes a copying mode set key 33a for setting the initial mode (the mode obtained immediately after a power switch, not shown, is turned on) to the copying mode, and a filing mode set key 33b for setting the initial mode to the filing mode. It also includes a mode change key 33c for inputting a switching signal for switching the initial mode.

A mode set section 34 includes a copy mode key 34a for selecting the copy mode and a file mode key 34b for selecting the filing mode. It further includes an enter key 34c, a search key 34d, and an output key 34e. The enter key 34c is used to execute various functions in the filing mode.

The display panel 32 is a switch panel constituted by a display section 32a formed of a liquid crystal display with back light and a touch panel 32b having a plurality of switches attached thereon. Conditions or the like displayed on the display section 32a can be selectively input by depressing corresponding portions of the panel 32.

Operation of system 100 will now be described.

FIG. 9 is a flowchart for explaining processes of initializing immediately after the power switch (not shown) of the image forming system is turned on and changing modes.

When the power switch of the image processing system 100 is turned on, data (or initializing data) stored in the non-volatile memory of the main memory 12 is read by the CPU 11 of the main control unit 10, thereby initializing the system 100. Since the nonvolatile memory prestores data for setting a copying mode when the system is forwarded from the manufacture, the data is read by the CPU 11 and the system is set at the copying mode. At this time, an LED of the copy mode key 34a of the mode set section 34 of the control panel 30 is powered, which indicates that the initial mode is the copying mode.

Thereafter, the disk detector 83 is activated to check whether an optical disk is used (first check), thereby determining whether the user intends to use the system 100 as a copying apparatus or a filing apparatus. In other words, an output of the disk detector 83 is checked to determine whether an optical disk 333 is inserted in the optical disk unit 82.

If it is detected that an optical disk 333 is inserted, the system 100 is switched to the filing mode, and the LED of the file mode key 34b of the mode set section 34 of the console panel 30 is turned on, thereby informing that the filing mode is set.

Subsequently, whether documents D are set on the ADF 106 is checked to determine whether the user intends to input information to the filing apparatus or retrieve information therefrom.

If neither input nor search is demanded, a stand-by state, i.e., a so-called neutral state, is maintained.

If documents D are set on the ADF 106, a input (read) mode is set to file data.

When it is confirmed that the documents D are set on the ADF 106, the system is switched form the stand-by state to a file input state in which the above-described file input operation is performed, i.e., the documents D are fed by the ADF 106 and information on the documents is filed.

When the information on all of the documents D has been filed, it is checked whether the optical disk 333 is ejected or is not ejected (second check). If the optical disk 333 is ejected, the system 100 is switched from the filing mode to the copying mode. The copying mode is maintained until it is detected that the optical disk 333 is inserted in the optical disk apparatus 82. If the optical disk 333 is not ejected, it is checked again whether documents D are set on the ADF 106. If it is detected that documents D are set on the ADF 106, the above-described file input process is repeated.

If it is not detected that documents D are set on the ADF 106, the display section 32a of the display panel 32 displays instructions to select either an input or search function, and the system is maintained in the stand-by state for a predetermined period of time, e.g., one minute. At the same time, an overtime is checked by measuring a time elapsed after the system has been set in the stand-by state.

When one minute elapses after the system has been set in the stand-by state, the filing mode is switched to the copying mode. Thereafter, the copying mode is maintained until the optical disk 333 is inserted in the optical disk unit 82. In the copying mode, a copying operation is started when the print start key 31a of the console panel 30 is turned on.

If the enter key 34c of the mode set section 34 of the console panel 30 is turned on during the stand-by state and the filing mode is selected, it is checked again whether documents D are set on the ADF 106.

On the other hand, if the search key 34d of the mode set section 34 is turned on, the search function is selected and files recorded on the disk are searched in sequence. More specifically, data recorded in a specific portion of the optical disk 333 inserted in the optical disk apparatus 82 are read in sequence by the optical head device (not shown).

When the file search operation is completed, instructions for the user to determine whether the searched file data should be printed or not are displayed on the display section 32a of the display panel 32, and the stand-by state is maintained.

If it is determined to print the searched file data by turning on the output key 34e of the mode set section 34, data recorded on the disk 333 is output through the laser beam printer unit 72. More specifically, the read data is input to the CODEC 42 of the image data processor unit 40 through the data-bus line 22, and converted to printing signals by the image processing module 41. The printing signals are supplied to the printer unit 72 through the printer interface 71. In this manner, a desired image is output to a sheet of paper P.

When the printing operation is completed, the above stand-by state is maintained and the system is kept in the filing mode until a next instruction is input or an overtime is detected.

Figure 10:
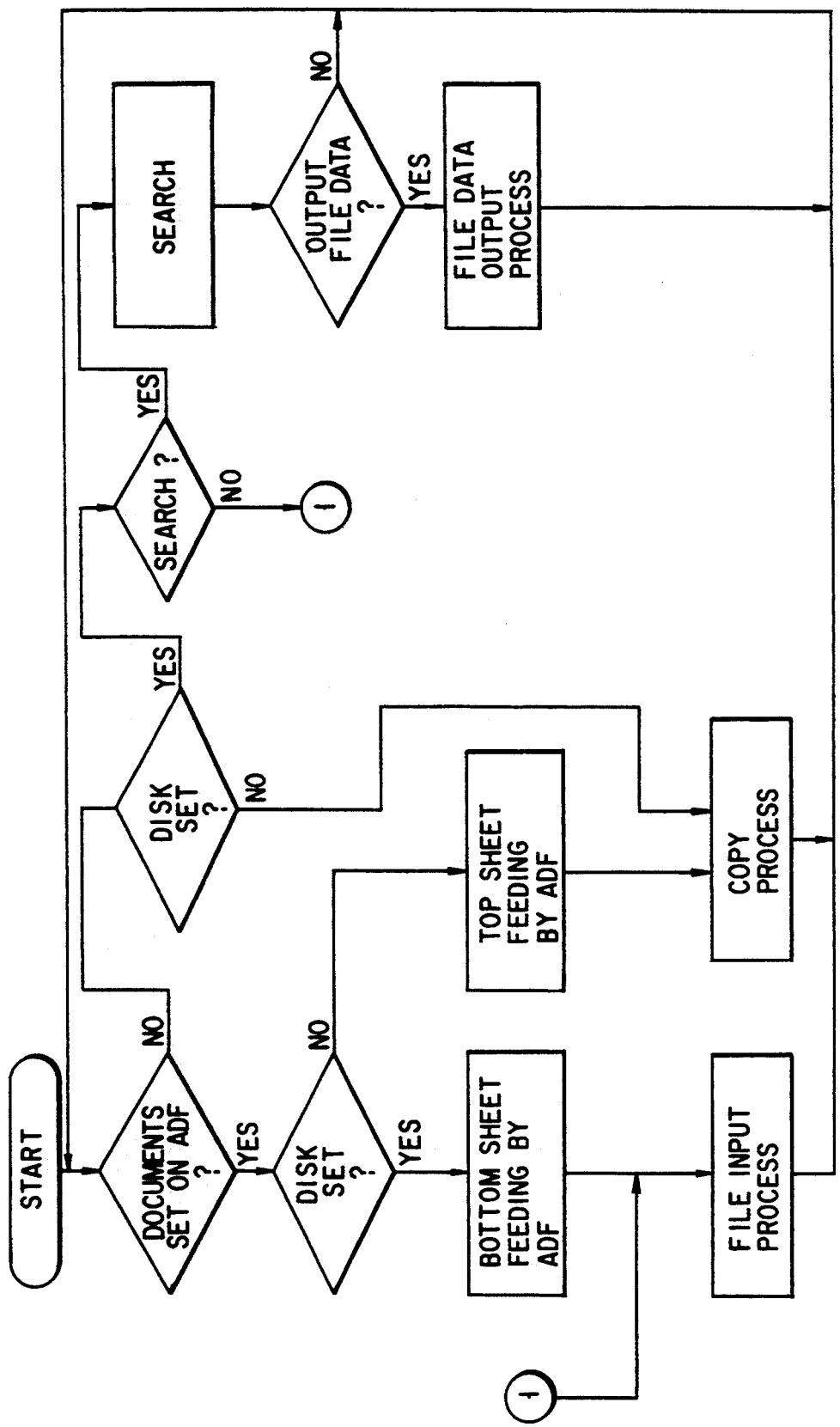
FIG. 10 is a flowchart for explaining a process of setting modes.

FIG. 10 shows a process of setting modes. In the process of FIG. 10, the copying mode is automatically switched to the filing mode, or vice versa, in accordance with whether the optical disk 333 is inserted in the optical disk unit. If documents D are fed by the ADF 106, the stacker trays, on which the documents D are stacked, are automatically switched in accordance with the selected mode.

Figure 11:
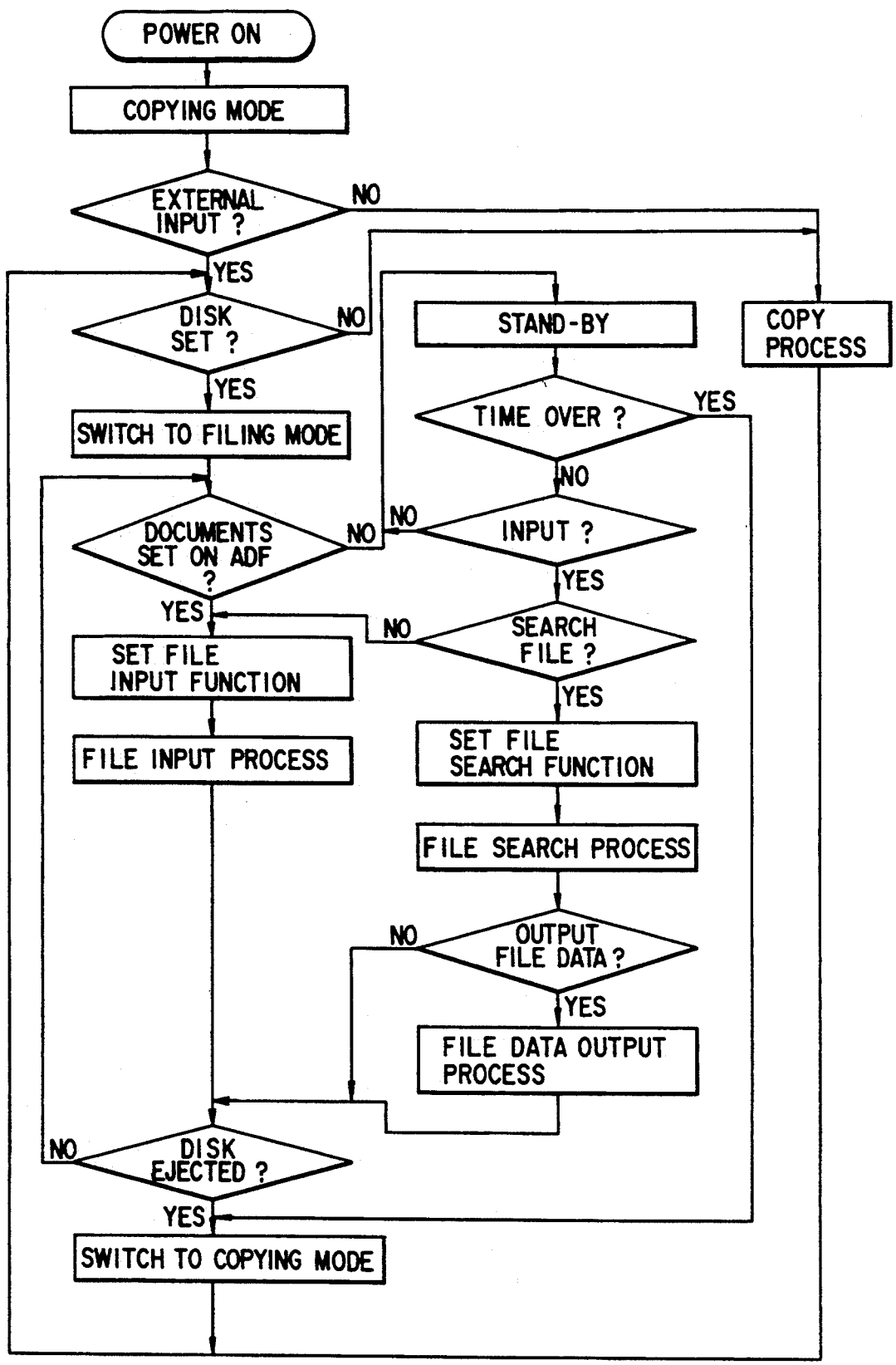
FIG. 11 is a flowchart for explaining a process in which an external input is applied to the process shown in FIG. 9.

FIG. 11 shows a modified process of initializing and changing modes shown in FIGS. 9 and 10. In the process of FIG. 11, when the power switch of the image processing system 100 is turned on, data (or initializing data) recorded on the non-volatile memory in the main memory 12 is read via the CPU 11, thereby initializing the system 100. As described above with reference to FIG. 9, the non-volatile memory prestores data for setting the system in the copying mode and, therefore, the system is set in the copying mode by writing the data into the CPU 11. The LED of the copy mode key 34a is powered, which indicates that the initial mode is the copying mode.

Subsequently, it is checked by the CPU 11 whether image data is input through the AUX I/F 14 from an external device such as a facsimile, a host computer, or a word processor.

Thereafter, the disk detector 83 is activated to check whether an optical disk is used (first check), thereby determining whether the user intends to use the system 100 as a copying apparatus or a filing apparatus. In other words, an output of the disk detector 83 is checked to determine whether an optical disk 333 is inserted in the optical disk unit 82.

In the same manner as in the process shown in FIG. 9, if the optical disk 333 is inserted, the filing mode is set. The image data input from the external device is transmitted through the data-bus line 22 to the CODEC 42 and compressed on the basis of an appropriate rule. The compressed data is supplied through the data-bus line 22 and the filing interface 81 to the optical disk unit 82, i.e., stored in the optical disk 333.

If the optical disk 333 is not inserted, the image data output from the external device is transmitted through the data-bus line 22 to the CODEC 42 and expanded on the basis of an appropriate rule. The expanded data is converted to printing signals by the image processing module 41. The printing signals are supplied through the printer interface 71 to the printer unit 72, to output a desired image to a sheet of paper P.

Another operation of the system 100 will now be described.

FIGS. 12 and 13 show a process of changing the initial conditions of the system when the power switch of the processing system is turned on, for example, the condition stored in the non-volatile memory in the main memory 12.

When the power switch of the image processing system 100 is turned on, data (or initializing data) is read from the non-volatile memory in the main memory 12 by the CPU 11 of the main control unit 10, thereby initializing the system 100.

When the system 100 is set in a stand-by state, the display section 32a of the display panel 32 displays instructions as to whether the initializing data should be changed or not.

To change the initial mode, the user depresses the mode change key 33c of the initializing section 33 in accordance with the instructions displayed on the display section 32a, the copying mode set key 33a or the filing mode set key 33b. Thus, the initial mode can be changed.

The initial mode of the system 100 is determined on the basis of the content of the non-volatile memory of the main memory 12 (initial data). When the system is forwarded from the manufacturer, the initial data of the system is set in a copying mode. If the user wishes to change the initial mode to a filing mode, the initial data stored in the non-volatile memory can be changed from the copying mode to the filing mode by turning on the filing mode set key 33b (FIG. 13).

Operation of the system 100 when the initial mode is changed to the filing mode will be described.

Figure 14:
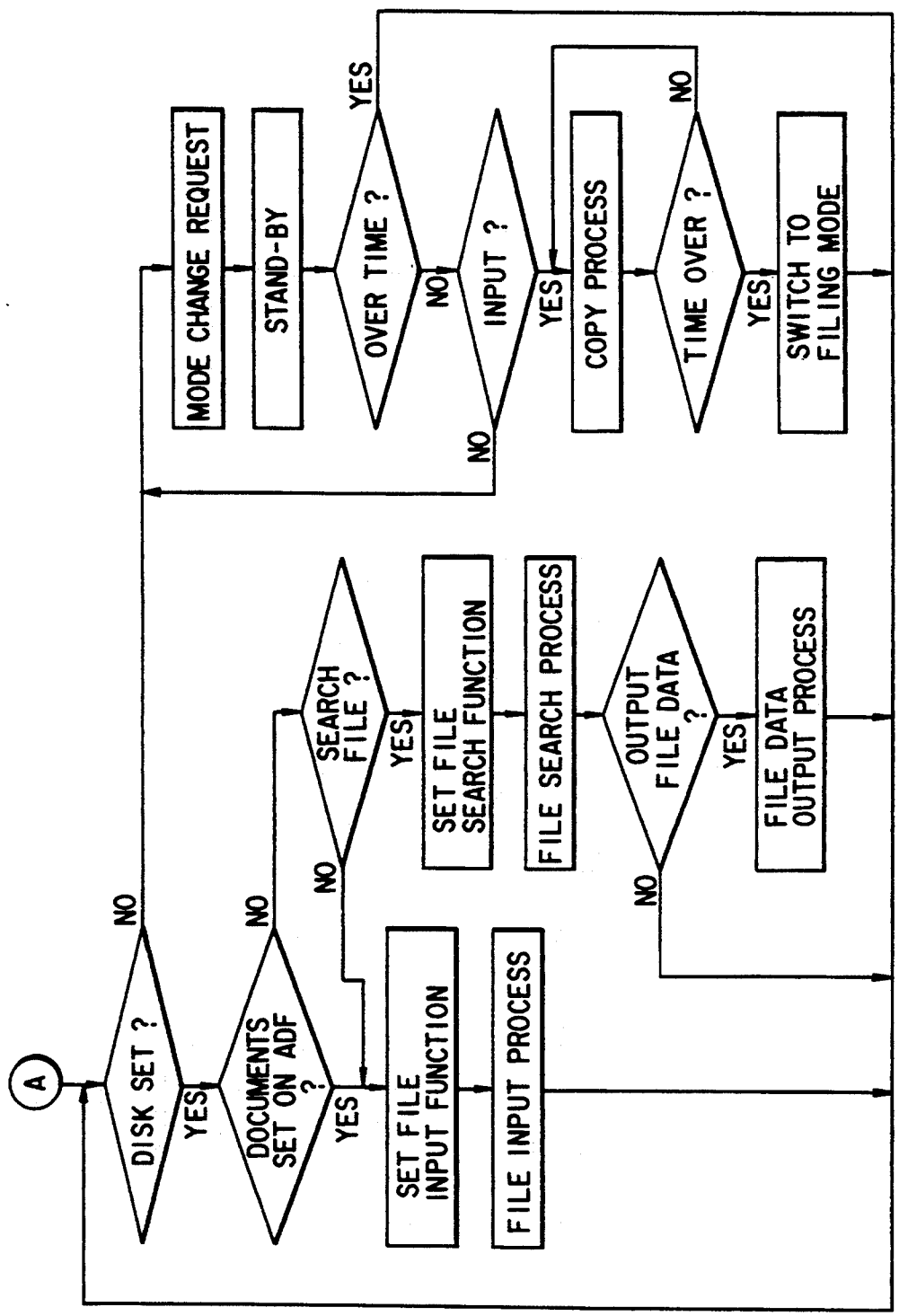

As shown in FIG. 14, if the initial data is changed and a filing mode is input as the initial data, the disk detector 83 is activated to check whether the optical disk 333 is inserted. Thus, the user checks which mode is to be selected.

If it is detected that the optical disk 333 is inserted, whether documents D are set on the ADF 106 is checked. As a result, it is determined whether the user intends to input information in the filing apparatus or to search information therefrom.

If neither input nor search is demanded, a stand-by state, i.e., a so-called neutral state, is maintained.

If documents D are set on the ADF 106, a input (read) mode is set to file data.

When it is confirmed that documents D are set on the ADF 106, the system is switched from the stand-by state to a file input state, in which the above-described file input operation is performed, i.e., the documents D are fed by the ADF 106 and information on the documents is filed.

If it is not detected that documents D are set on the ADF 106, the display section 32a of the display panel 32 displays instructions to select either an input or search, and the system is maintained in the stand-by state for predetermined period of time, e.g., one minute. At the same time, an overtime is checked by measuring a time elapsed after the system has been set in the stand-by state.

If the enter key 34c of the mode set section 34 of the console panel 30 is turned on during the stand-by state and the filing function is selected, it is checked again whether documents D are set on the ADF 106. If the search key 34d of the mode set section 34 is turned on, the search function is selected and files recorded on the disk are searched in sequence. More specifically, data recorded in a specific portion of the optical disk 333 inserted in the optical disk unit 82 are read in sequence by the optical head device (not shown).

When the file search operation is completed, instructions for the user to determine whether the searched file data should be printed or not are displayed on the display section 32a of the display panel 32, and the stand-by state is maintained.

If it is detected that the optical disk 333 is not inserted and the user wishes to use the system 100 as a copying apparatus, the copying mode can be set by turning on the mode change key 33c of the initializing section 33, so that a copying operation can be performed.

More specifically, when it is detected that the optical disk 333 is not inserted, the display section 32a of the display panel 32 displays instructions as to whether the copying mode should be set, and the system is maintained in the stand-by state for predetermined period of time, e.g., one minute. At the same time, an overtime is checked by measuring a time elapsed after the system has been set in the stand-by state.

When one minute elapses after the system is set in the stand-by state, the stand-by state for changing the filing mode to the copying mode is canceled. Thereafter, the initial mode of filing is maintained.

If the copy mode key 34a of the mode set section 34 is turned on during the stand-by state (within one minute) and the copying function is selected, the system 100 is changed from the filing mode to the copying mode. In the copying mode, a copying operation is started by turning on the print start key 31a.

When the copying operation is completed, an overtime is checked again, i.e., the time elapsed after the system has been set in the stand-by state is measured. The system is maintained in the copying state for one minute after the copying operation has been completed, until a next input or overtime is detected.

When a next input or overtime is detected, the copying mode is automatically switched to the initial mode, i.e. the filing mode. Then, it is checked again whether the optical disk is set.

If the mode determined on the basis of the initial data is a copying mode and it is not changed, the system is operated in accordance with the flowchart shown in FIG. 16 as will be described later.

Figure 15:
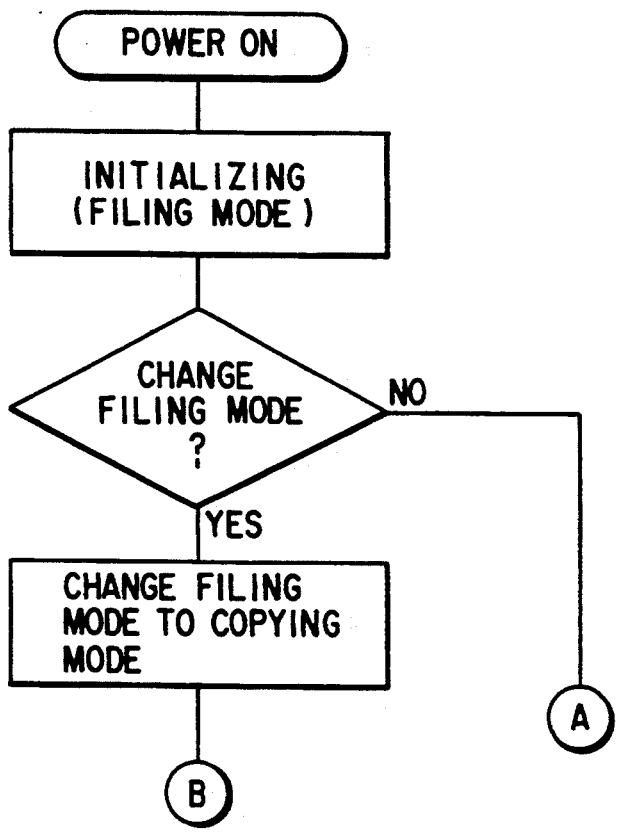

If the initial mode determined on the basis of the initial data is a filing mode, the initial data stored in the non-volatile memory can be changed as shown in FIG. 15 from the filing mode to a copying mode by turning on the copying mode set key 33a of the initializing section.

More specifically, as shown in FIG. 16, it is checked whether an optical disk 333 is inserted (first check), thereby determining whether the user intends to use the system 100 as a copying apparatus or a filing apparatus.

If it is detected that an optical disk 333 is inserted, the system 100 is switched from the copying mode to the filing mode, and the LED of the file mode key 34b of the mode set section 34 of the console panel 30 is turned on, thereby informing the user that the filing mode is set.

Subsequently, whether documents D are set on the ADF 106 is checked to determine whether the user intends to input information to the filing apparatus or search information therefrom.

If neither input nor search is demanded, a stand-by state, i.e., the neutral state, is maintained.

If documents D are set on the ADF 106, an input (read) mode is set to file data.

When it is confirmed that the documents D are set on the ADF 106, the system is switched from the stand-by state to a file input state in which the above-described file input operation is performed, i.e., the documents D are fed by the ADF 106, and information on the documents is filed.

When the information on all of the documents has been filed, it is checked whether the optical disk 333 is kept inserted (second check). If the optical disk 333 is withdrawn, the system 100 is switched from the filing mode to the copying mode. The copying mode is maintained until it is detected that the optical disk 333 is inserted in the optical disk apparatus 82. If the optical disk 333 is kept inserted, it is checked again whether documents D are set on the ADF 106. If it is detected that documents D are set on the ADF 106, the above-described file input process is repeated.

If it is not detected that documents D are set on the ADF 106, the display section 32a of the display panel 32 displays instructions to select either an input or a search function, and the system is maintained in the stand-by state for a predetermined period of time, e.g., one minute. At the same time, an overtime is checked by measuring a time elapsed after the system has been set in the stand-by state.

When one minute elapses after the system has been set in the stand-by state, the filing mode is switched to the copying mode. Thereafter, the copying mode is maintained until the optical disk 333 is inserted in the optical disk apparatus 82. In the copying mode, a copying operation is started when the print start key 31a of the console panel 30 is turned on.

If the enter key 34c of the mode set section 34 of the console panel 30 is turned on during the stand-by state and the filing function is selected, it is checked again whether documents D are set on the ADF 106.

When the file search operation is completed, instructions for the user to determine whether the searched file data should be printed or not are displayed on the display section 32a of the display panel 32, and the stand-by state is maintained.

If it is determined to print the searched file data by turning on the output key 34e of the mode set section 34, data recorded on the disk 333 is output through the laser beam printer unit 72. More specifically, the read data is input to the CODEC 42 of the image data processor unit 40 through the data-bus line 22, and converted to printing signals by the image processing module 41. The printing signals are supplied to the printer unit 72 through the printer interface 71. In this manner, a desired image is output to a sheet of paper P.

When the printing operation is completed, the above stand-by state is maintained and the system is kept in the filing mode until a next instruction is input or overtime is detected.

If the initial mode determined on the basis of the initial data is a filing mode and it is not changed, the system is operated in accordance with the flowchart shown in FIG. 14.

As has been described above, according to the present invention, the integrated apparatus can be changed from a copying mode to a filing mode only by setting a recording medium on the storage means. Therefore, the manual operation of switching the modes is unnecessary. In addition, documents can be fed in the order suitable for the filing mode only by setting recording medium on the storage means. Moreover, the documents fed in the order suitable for the filing mode are stacked on the stacker tray in the same order as initially set on the document tray.

In the above embodiments, the image forming system comprises a document pick-up mechanism for feeding documents beginning with either the top sheet or the bottom sheet. However, the present invention is not limited to these embodiments but can be variously modified within the spirit and scope of the invention.

What is claimed is:

1. An image reading apparatus comprising:
   means for reading images recorded on documents;
   means for holding the documents on which the images to be read by the reading means are recorded;
   means for feeding the documents from the holding means, the feeding means including a first taking out roller which is brought into contact with a top sheet of the documents for taking out the top sheet of the documents and a second taking out roller which is brought into contact with a bottom sheet of the documents, the first and second taking out rollers being selectively activated in accordance with conditions for taking out the documents; and
   means for transporting the documents taken out by the feeding means to the reading means.

2. The image reading apparatus of claim 1, wherein the documents are taken out to perform a printing operation or a filing operation.

3. The apparatus according to claim 1, wherein the transporting means include at least two pairs of rollers for limiting one by one the documents taken out by one of the first and second taking out rollers and supplied to the reading means.

4. The apparatus according to claim 3, wherein when one of the pairs of rollers is activated and brought into contact with each other, another one of the pairs of rollers is opened so as not to apply a restraining force to a piece of document to be transported to the reading means.

5. The apparatus according to claim 4, wherein an upper roller of the pair of rollers, positioned above the documents, which transport the piece of document supplied from the first taking out roller, is rotated in the same direction as the rotation of the first taking out roller, and a lower roller of the pair of rollers, positioned below the documents, is rotated in the opposite direction.

6. The apparatus according to claim 4, wherein a lower roller of the pair of rollers, positioned below the documents, which transport the piece of document supplied from the second taking out roller, is rotated in the same direction as the rotation of the second taking out roller, and an upper roller of the pair of rollers, positioned above the documents, is rotated in the opposite direction.

7. An image forming apparatus comprising:

means for reading images recorded on documents;

means, including an image bearing member, for forming an image on the image bearing member based on an image read by the reading means and forming the image on a transferring member;

means for holding the documents on which the images to be read by the reading means are recorded;

means, having a recording medium, for storing the images read by the reading means in the recording medium;

means, including a first taking out roller member for taking out a top sheet of the documents and a second taking out roller member for taking out a bottom sheet of the documents, for feeding the documents by means of the first taking out roller member when the images read by the reading means are to be formed on the image forming means, and by means of the second taking out roller member when the images are to be stored in the recording medium of the storing means; and means for transporting the documents taken out by the feeding means to the reading means.

8. The apparatus according to claim 7, wherein the reading means includes a first stock portion for turning over and stocking the documents read by the reading means itself and a second stock portion for stocking the documents without turning them over, and the documents are stacked on the first stock portion when they are fed by the first taking out roller member and on the second stock portion when they are fed by the second taking out roller member.

9. An image forming apparatus comprising:

means for reading images recorded on documents;

means for holding the documents on which the images to be read by the reading means are recorded;

means, including a first taking out roller member for taking out a top sheet of the documents and a second taking out roller member for taking out a bottom sheet of the documents, for feeding the documents;

means for transporting the documents taken out by the feeding means to the reading means;

means, including an image bearing member, for forming an image on the image bearing member based on an image read by the reading means and forming the image on a transferring member;

means, having a recording medium which is inserted from outside, for storing the images read by the reading means in the recording medium;

means for inputting image data to the image forming apparatus from an external device such as a facsimile, a host computer, and a word processor; and means for selecting one of:

a) causing the storing means to store the image data input through the inputting means in the recording medium, when the recording medium is inserted in the storing means and no document is set on the holding means;

b) causing the second taking out roller member to take out a bottom sheet of the documents stacked on the holding means, the reading means to read an image on the bottom sheet of the documents, and the forming means to form the image read by the reading means, when the recording medium is inserted in the storing means and no document is set on the holding means;

c) activating the forming means, when image data is input through the inputting means in a state where no recording medium is inserted in the storing means and no document is set on the holding means, to form the image on the basis of the image data input through the inputting means; and d) causing the first taking out roller member to take out a top sheet of the documents stacked on the holding means, the reading means to read an image on the top sheet of the document, and the forming means to form the image read by the reading means, when the documents are set on the holding means in a state where no recording medium is inserted in the storing means.

* * * * *